United States Patent Office 3,080,243
Patented Mar. 5, 1963

3,080,243
BASING CEMENT
Vincent Vodicka, South Euclid, Ohio, assignor to General Electric Company, a corporation of New York
No Drawing. Filed Sept. 14, 1960, Ser. No. 55,837
7 Claims. (Cl. 106—67)

My invention relates to a cement for bonding glass to articles of other material such as metal for instance, and more particularly to a basing cement for attaching the base of an electric lamp or similar device to the glass envelope thereof.

Electric lamp bases are generally secured to the envelope of the lamp by means of a so-called basing cement. The conventional bonding cements employed for such purpose ordinarily contain, as one or more of their constituent ingredients, organic materials, for example, natural resins such as rosin and shellac and synthetic resins such as phenol-furfural or phenol-formaldehyde resins, which are subject to deterioration at elevated temperatures above 250° C. or so. Such heat-deterioration of these organic material ingredients therefore causes the cement to lose its bonding strength when it is subjected to such elevated temperatures. For this reason, such conventional organic type cements are entirely unsuitable for high-temperature applications where they are continuously subjected to temperatures above 250° C.

As a bonding cement which will satisfactorily retain its bonding strength at high temperatures well above 250° C., it has been proposed to employ certain inorganic compositions composed mainly of soluble silicates. The prior compositions of this type which have been proposed for such purpose, however, have been found to be unsatisfactory for lamp basing purposes because of their hard drying and poor moisture resistance characteristics, the cements losing a substantial part of their bonding strength when subjected to high humidity conditions.

It is an object of my invention, therefore, to provide a basing cement which possesses a high bonding strength and which substantially retains its bonding strength when subjected to conditions of high temperature and high humidity.

Another object of my invention is to provide a basing cement of the above-mentioned characteristics having a long pot life and which can be produced at a reasonable cost.

Briefly stated, in accordance with one aspect of my invention, a high temperature and moisture resistant basing cement composition is formed by an admixture of powdered kaolin and powdered aluminum phosphate, one of which materials is calcined and the other of which is hydrated, together with a major proportion of powdered aluminum oxide and sufficient phosphoric acid to form the admixture into a paste. According to a further aspect of the invention, a very small amount or trace of sodium is introduced into the basing cement composition, preferably in the form of a soluble sodium phosphate salt, in order to thereby further improve the moisture resistance of the cement.

Further objects and advantages of my invention will appear from the following detailed description of species thereof.

The basing cement composition according to the invention is composed entirely of inorganic materials and consists principally of an admixture of powdered kaolin (i.e., aluminum silicate) and powdered aluminum phosphate, one of which materials is calcined and the other of which is hydrated or uncalcined, together with a major proportion by weight of powdered aluminum oxide, and sufficient concentrated phosphoric acid to form the admixture into a paste of the desired consistency.

For the purposes of the invention, the combined amount of kaolin and aluminum phosphate present in the cement ranges from approximately 5 to 12% by weight of the total composition, with the amount by weight of kaolin ranging approximately from one and one-fourth to twice the weight of aluminum phosphate, and the amount by weight of aluminum oxide ranging from approximately three to ten times, and preferably amounting to approximately five times, the combined weight of kaolin and aluminum phosphate, the balance of the admixture consisting essentially of concentrated phosphoric acid. To further improve the moisture resistance of the basing cement, sodium in the form of a soluble sodium phosphate salt is preferably added to the composition in a minute amount ranging from 1 to 5% by weight of the aluminum phosphate content. The sodium addition need be made only in the event the aluminum phosphate employed does not itself contain any sodium content. For introducing the sodium into the composition, any of the soluble sodium phosphate salts may be employed, such as the monobasic, dibasic and tribasic forms thereof. However, the dehydrated form of dibasic sodium phosphate, having the formula $Na_2HPO_4$, is preferably employed for the purpose of introducing sodium into the cement composition.

Of the various basing cement compositions included within the above-mentioned formulations, the cements employing calcined kaolin, and uncalcined or hydrated aluminum phosphate, are much preferred because of their superior moisture resistance and bonding strength-retaining characteristics. Accordingly, the preferred form of basing cement according to the invention is of the following approximate composition by weight:

| | | |
|---|---|---|
| Kaolin (calcined) | percent | 5½–15. |
| $AlPO_4 \cdot H_2O$ (hydrated) | do | 4–10. |
| $Na_2HPO_4$ | do | 0–½. |
| $Al_2O_3$ (150–250 mesh) | do | 75–90. |
| $H_3PO_4$ (concentrated) | | Sufficient to form a paste. |

Within the above-mentioned range of compositions, a specific form of basing cement which has been found to be particularly effective for the purposes of the invention is of the following approximate composition by weight:

| | | |
|---|---|---|
| Kaolin (calcined) | percent | 4½ |
| $AlPO_4 \cdot H_2O$ (hydrated) | do | 3½ |
| $Na_2HPO_4$ | do | 0.06 |
| $Al_2O_3$ (150–250 mesh) | do | 41 |
| $H_3PO_4$ (concentrated) | | Balance |

The aluminum oxide component of the basing cement according to the invention is the ingredient which is responsible for the high moisture resistance of the cement, both during the preparation and the use thereof. Atmospheric humidity has no effect whatever on the moisture resistance of the cured cement. For best results, it is preferred to employ, as the aluminum oxide component of the cement composition, either that made by the Fisher Scientific Company and known as their A591 grade aluminum oxide, or that made by the Aluminum Company of America and known as their Alcoa A–1 calcined alumina. For lamp basing cement applications, the aluminum oxide should be in the form of a powder having a particle size preferably ranging from approximately 150 to 250 mesh. Material finer than this tends to introduce strains in the glass of the lamp bulb, resulting in the lamp breaking when subjected to a load. For applications other than lamp basing, the particle size of the aluminum oxide is unimportant and can be varied to a considerable extent beyond the particle size limits mentioned above.

In preparing the cement composition according to the invention, the dry powder components thereof, i.e., the kaolin, aluminum phosphate, aluminum oxide and sodium phosphate, are first thoroughly mixed together to form a dry powder admixture. The phosphoric acid is then added just before use. After mixing, the cement may be kept in a closed container for several weeks without appreciable deterioration, the cement having a minimum pot life of approximately four weeks.

In the normal use of the basing cement, proper heat curing is necessary in order to develop the desired initial bonding strength and moisture resistance. The best results are obtained with the cement cured at 350° C. for fifteen to thirty minutes. However, good results can be obtained by an initial set followed by post-curing at elevated temperatures. The initial set should be equivalent to four minutes at 350° C., while the post-curing should be not less than twenty minutes at 350° C.

When used as a basing cement to fasten a lamp base to the glass bulb of a lamp, the initial bonding or torsion strength of the cement compositions according to the invention will be above 50 inch pounds. After ninety days in a 100° humidity chamber, the bonding strength of the cement will still be above 40 inch pounds. In contrast thereto, the initial torsion strength of the previously proposed inorganic high-temperature lamp basing cements amounts to around 24 inch pounds and it drops to around 16 inch pounds or so after ninety days in a humidity chamber.

With cement compositions according to the invention, the viscosity of the cement is not critical to the attainment of its maximum bonding strength and moisture resistan properties. Instead, the phosphoric acid component, which controls the viscosity of the cement, can be added over a wide range of percentage content by weight without causing any appreciable decrease in the bonding strength of the cement. Moreover, because of their relative insensitivity to atmospheric humidity conditions during both their preparation and use, the cements according to the invention do not require the close control of atmospheric humdity, during the mixing and preparation of the cement for proper performance thereof, such as is required for the previously proposed high temperature basing cements, such close control over atmospheric humidity rendering the manufacture of such previously proposed basing cements impractical.

What I claim as new and desire to secure by Letters Patent of the United States is:

1. A basing cement composition consisting essentially of an admixture of powdered kaolin and powdered aluminum phosphate of the formula $AlPO_4$, one of said kaolin and aluminum phosphate materials being hydrated and the other calcined, together with powdered aluminum oxide and concentrated phosphoric acid, the combined amounts of kaolin and aluminum phosphate ranging from approximately 5 to 12% by weight of the total composition with the amount by weight of kaolin ranging from approximately one and one-fourth to twice the weight of aluminum phosphate, and the amount by weight of aluminum oxide ranging from approximately 3 to 10 times the combined weight of kaolin and aluminum phosphate, the balance of the admixture being composed of phosphoric acid in an amount sufficient to form the composition into a paste.

2. A basing cement composition as specified in claim 1 wherein the said powdered kaolin ingredient is calcined and the powdered aluminum phosphate ingredient is hydrated.

3. A basing cement composition as specified in claim 1 and containing in addition a small amount of a soluble powdered sodium phosphate salt ranging from 1 to 5% by weight of the aluminum phosphate content.

4. A basing cement composition as specified in claim 1 and containing in addition a small amount of dibasic sodium phosphate ranging from 1 to 5% by weight of the aluminum phosphate content.

5. A basing cement composition consisting essentially of an admixture of, by weight, approximately 5½ to 15% calcined powdered kaolin, 4 to 10% hydrated powdered aluminum phosphate of the formula $AlPO_4$, 0 to ½% of a soluble powdered sodium phosphate salt and 75 to 90% powdered aluminum oxide, said composition having admixed therewith a sufficient amount of concentrated phosphoric acid to form it into a paste.

6. A basing cement composition consisting essentially of an admixture of, by weight, approximately 5½ to 15% calcined powdered kaolin, 4 to 10% hydrated powdered aluminum phosphate of the formula $AlPO_4$, 0 to ½% dibasic sodium phosphate and 75 to 90% powdered aluminum oxide, said composition having admixed therewith a sufficient amount of concentrated phosphoric acid to form it into a paste.

7. A basing cement composition consisting essentially, by weight, of the order of 4½% calcined powdered kaolin, 3½% hydrated powdered aluminum phosphate of the formula $AlPO_4$, .06% powdered dibasic sodium phosphate, 41% powdered aluminum oxide, and the balance concentrated phosphoric acid.

References Cited in the file of this patent

FOREIGN PATENTS 627,826    Great Britain _____ Aug. 17, 1949